United States Patent [19]
Sauvage et al.

[11] Patent Number: 5,282,413
[45] Date of Patent: Feb. 1, 1994

[54] INSTALLATION FOR STEEPING GRAINS

[75] Inventors: René Sauvage, Eulmont; James Roget, Pulnoy; Jean Amstutz, Remereville; Guy Flament, Bayon, all of France

[73] Assignee: Nordon et Cie, Mamcu Cedex, France

[21] Appl. No.: 987,769

[22] Filed: Dec. 10, 1992

[30] Foreign Application Priority Data

Dec. 10, 1991 [FR] France ............... 91 15281

[51] Int. Cl.⁵ .............. B01F 7/00; C12C 1/00; C12C 1/02; C12C 1/14
[52] U.S. Cl. .............. 99/278; 99/516; 99/277.2; 366/289; 366/331; 435/305; 435/307; 435/308
[58] Field of Search .............. 99/495, 490, 516, 534, 99/348, 276-278; 426/18, 28-30, 64; 435/185, 302, 304-306, 307, 308, 93; 366/289, 331

[56] References Cited

U.S. PATENT DOCUMENTS

| 395,468 | 1/1889 | Whitney | 435/307 |
|---|---|---|---|
| 409,956 | 8/1889 | Gent | 435/307 |
| 3,647,473 | 3/1972 | Stowell et al. | 99/278 |
| 3,796,143 | 3/1974 | Schlimme et al. | 99/277.2 |
| 3,814,003 | 6/1974 | Vacano | 99/276 |
| 3,834,296 | 9/1974 | Kehse et al. | 99/277.2 |
| 3,840,435 | 10/1974 | Damon | 435/307 |
| 3,962,478 | 6/1976 | Hohlbein et al. | 426/29 |
| 3,989,848 | 11/1976 | Moll et al. | 426/30 |
| 4,181,743 | 1/1980 | Brumlick et al. | 99/516 |
| 4,277,505 | 7/1981 | Simpson | 435/305 |
| 4,286,065 | 8/1981 | Kaluniants et al. | 435/305 |
| 4,494,451 | 1/1985 | Hickey | 426/30 |
| 4,599,991 | 7/1986 | Horton et al. | 99/278 |
| 4,659,662 | 4/1987 | Hsu | 99/276 |
| 4,837,156 | 6/1989 | Lampinen | 99/277.2 |

FOREIGN PATENT DOCUMENTS

| 1917972 | 6/1969 | Fed. Rep. of Germany . |
| 1538177 | 1/1979 | United Kingdom . |
| 2135692 | 5/1984 | United Kingdom . |

Primary Examiner—Timothy F. Simone
Attorney, Agent, or Firm—Larson and Taylor

[57] ABSTRACT

Installation for steeping grains of the type comprising a tank (1) provided with a cylindrical lateral wall (2), with a bottom (3) and with a perforated platform (11) disposed at a certain distance from the bottom (3) and on which the grain rests in a layer of suitable thickness, the upper surface of this layer of grains being able to be levelled by a rotary system with raking arms (6) carrying blades and associated with a first motor (9) capable of rotating them, a second motor (10) being coupled to the system in order to make it vertically movable. This installation comprises removable connection making it possible to connect, mechanically and temporarily, the perforated platform (11) to the system with raking arms (6) and blades or directly to the second motor (10).

10 Claims, 2 Drawing Sheets

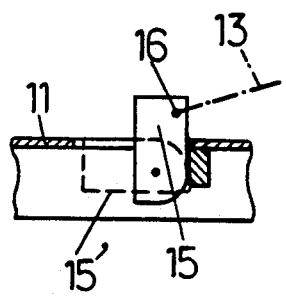
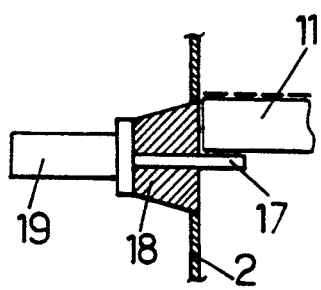
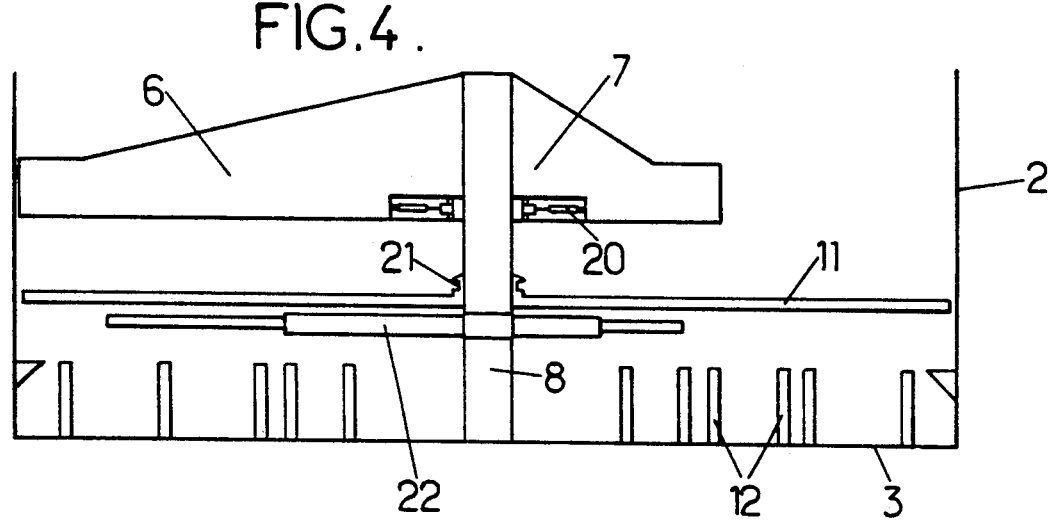
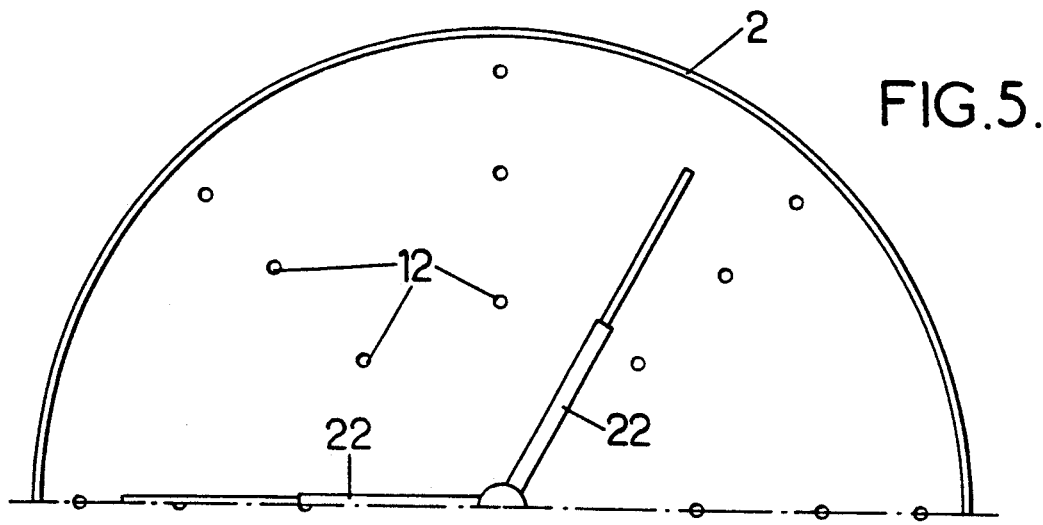

INSTALLATION FOR STEEPING GRAINS

FIELD OF THE INVENTION

The present invention relates to an installation for steeping grains, in particular for malting, of the type comprising a tank provided with a cylindrical lateral wall, with a bottom and with a perforated platform disposed at a certain distance from the bottom and on which the grain which is to be subjected to operations such as steeping, germination, drying or kilning rests in a layer of suitable thickness, the upper surface of this layer of grains being able to be levelled by a rotary system with raking arms carrying blades and associated with first motor means capable of rotating them, second motor means being coupled to the system in order to make it vertically movable.

The tank may receive for example a load of dry barley and be filled with water, the objective being in this case to bring the barley by steeping to approximately 45% moisture content and to initiate the germination which will continue in a second phase of the process, these two phases being partly able to take place in the same tank.

The system of arms with raking blades essentially comprises one or more arms connected to a central hub, each arm comprising directed blades which, according to the sense of rotation, push the grain outwards or draw it inwards. In steeping tanks, the system of arms with raking blades comprises a device for raising and lowering making it possible to place it at the required level; this is the purpose of the second motor means mentioned hereinabove.

It is currently sought, in such installations, to:

decrease the consumption of water as much as possible, and for example to use less than 4.5 m³ of water per ton of malt;

limit waste, for example cleaning products to be recycled, as much as possible; and obtain a completely cleanable installation; during the entire running, there should exist no zone where contaminating material could accumulate. This concept is not limited to disinfection, whose purpose is to kill the microorganisms and to the prevent proliferation with the connected problems of fermentation, smells, with the process. In disinfection, contaminating material actually remains in place but is neutralised; cleaning involves not only disinfection but also removal of contaminating material.

The latter criterion therefore requires that, by design, the installation and in particular the steeping tank should be able to retain only the minimum possible amount of contaminating material, and that all the parts of the tank should be easily accessible for cleaning and examination.

BACKGROUND OF THE INVENTION

It has hitherto been attempted to solve these problems in the following manner.

The most widespread cleaning technique consists in using a jet of pressurised water, with possibly the addition of appropriate cleaning products.

The upper face of the perforated platform is cleaned automatically, for example by booms or rotary sprays which are connected to the system with raking arms and blades and also ensure cleaning of the central shaft possibly provided in order to support and guide the raking system vertically, as well as of the walls of the tank. The most difficult part to clean is the space situated between the bottom and the perforated platform, in particular the lower face of the latter, as well as the elements of the carrying structure.

In order to solve this problem, the most widely used solution consists in positioning the perforated platform by construction, that is to say permanently, at the height of a man, and in having the cleaning performed by an operator using high-pressure equipment. This work is time-consuming, difficult and dangerous (slippery floor) and its quality depends on the operator. It must be added to this that the carrying structure of the platform rests on props in order to support the weight of the grain. The operator must therefore move among a multitude of props, which moreover hinders automatization using robotic means.

This solution has the additional drawback of requiring a very large volume of water in order to fill the space between the bottom and the perforated platform; the consumption of water is thus increased without any gain as regards the treatment of the grain.

Another solution has therefore been envisaged, consisting in providing a vertically movable perforated platform, and in raising it only at the time of cleaning, this platform thus having, during normal operation, its usual height above the bottom of the tank. Thus, the height beneath the perforated platform is reduced to its minimum, which, during steeping, allows the usual characteristics of the process to be retained, in particular the $CO_2$ extraction rate (8 to 10 m³/s) and the flow-rate of compressed air (180 to 200 mm head of water). This solution requires however the introduction beneath the platform of actuation means for raising it; these actuation means are then submerged in the steeping water and may constitute zones of accumulation of contaminating material which are hard to clean. It is moreover necessary to introduce a fluid beneath the perforated platform (electricity, compressed air, hydraulic fluid, etc.) in order to supply the aforementioned actuation means, which constitutes an additional drawback.

SUMMARY OF THE INVENTION

The object of the present invention is to remove the latter drawbacks of the prior art, whilst retaining the principle of the vertically movable perforated platform, in order still to have the ease of access to its lower surface during cleaning.

In order to do this, an installation of the type defined at the outset will, according to the present invention, be essentially characterised in that it comprises removable connection means making it possible to connect, mechanically and temporarily, the perforated platform to the system with raking arms and blades or directly to the second motor means.

The system with rotary arms and raking blades must be vertically movable in order to be able to adapt to the level attained by the free surface of the grain in the tank, both during the filling of the latter and during its emptying; this is the reason for the existence of the abovementioned second motor means. The invention therefore consists in exploiting this characteristic, and in allowing the temporary use of the means of lifting the raking system in order to lift the perforated bottom when the operations of cleaning the bottom of the tank are to be carried out. Thus, the invention requires only a limited number of additional means (the aforementioned removable temporary mechanical connection means), and makes it possible completely to dispense with the actuation means or the like which were previously provided beneath the perforated platform. Great economy of means is thus achieved, without appreciably increasing the zones capable of retaining contaminating material, and even removing some of them.

BRIEF DESCRIPTION OF THE DRAWINGS

The invention may be implemented according to different variants, some of which will be described hereinbelow by way of examples which are in no way limiting, with reference to the figures of the attached drawing in which:

FIGS. 2 and 3 represent details of this installation; and

FIGS. 4 and 5 represent certain details of a variant embodiment of this installation.

DETAILED DESCRIPTION OF THE PREFERRED EMBODIMENTS

Figure 1:
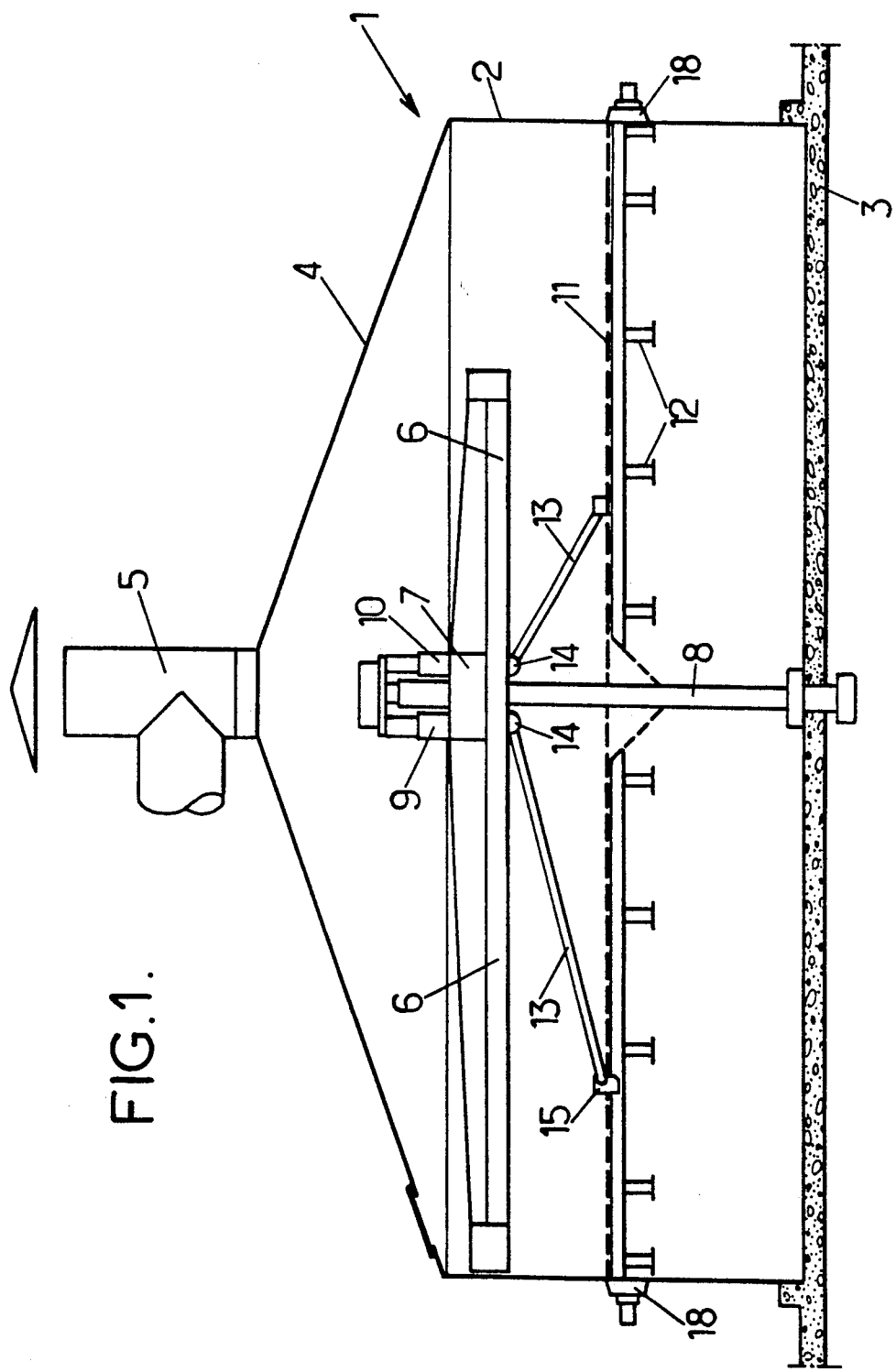
FIG. 1 is a schematic sectional view of an installation for steeping grains according to the invention.

The installation in FIG. 1 comprises a tank 1 with a cylindrical lateral wall 2, closed at its lower part by a bottom 3 and at its upper part by a dome 4 centrally provided with a duct 5 used for removing gases during operation. It may constitute a malting tank or the like, whose operation has not been described in greater detail, except for the parts to which the invention more specifically relates. As regards the system with raking arms and blades, moreover, reference could for example be made to French Patent No. 1 583 824 or to its Certificate of Addition No. 2 125 780 in the name of the Applicant Company. This system may for example include three horizontal arms 6 extending at 120° to each other and connected to a central hub 7 capable of rotating and sliding on an axial column or shaft 8 of the tank. The blades mounted on these arms (not represented) may be directable, in order to move the upper grain surface in a centripetal direction or in a centrifugal direction, as a function of the operations to be performed (filling of the tank, emptying, etc.). The hub 7 carries a first motor 9 capable of driving the raking system to rotate via a set of reducing gears, and a second motor 10 capable of driving the hub 7 so as to slide on the column 8, for example via a pinion and rack system. Since this part of the tank is known from the aforementioned Certificate of Addition, it is unnecessary to give any further description of this either.

The tank comprises, again in a known manner, a perforated platform 11 (or false bottom), disposed above the bottom 3 and intended to support the grain while allowing drainage of the water after steeping. This false bottom 11 is normally supported by the bottom 3 via a set of props 12.

In accordance with the invention and for the reasons cited hereinabove, this perforated platform 11 is made movable in height, inside the tank 1. In order to do this, according to a first embodiment, there are provided between the platform 11 and the arms 6 three detachable tie rods 13, i.e. one tie rod per arm. These tie rods 13 are hinged at 14 to the corresponding arm 6 (or directly to the hub 7), so that during normal operation of the tank, with the props 11 resting on the bottom 3, these tie rods 13 may be locked by any locking means along the arms 6, or inside the arms, in order not to hinder the raking and not to load the motor 9 further.

The other end of the tie rods 13 comprises a removable means for attachment and pivoting on the platform 11, as represented in detail in FIG. 2. A fork connector or the like 15, onto which the end of the tie rod 13 may be keyed at key 16 may, as seen in phantom by connector 15', be folded back into the platform 11, after this end of the tie rod 13 has been uncoupled, when it is desired to fold up all the tie rods against the corresponding arms 6, and thus allow the relowering of the platform 11 into the bottom position.

Advantageously, the points of connection of the tie rods 13 to the perforated platform 11 are situated approximately at ⅔ of the radius of the tank, this distance being measured from its axis. This allows the carrying structure to be optimized, and allows it to be dimensioned so that, under the influence of its own weight, the flexing of the false bottom 11 does not exceed a maximum value, for example 100 mm, while it is being lifted.

It is moreover to be noted that the attachment tie rods 13 may be metal (for example made of stainless steel in order to satisfy the requirements of cleanliness), but could also be made of any other material, for example from a composite material (fibre-reinforced plastic) in order to reduce their weight and to make their handling by an operator easier.

A maneuvering device with a winch or according to any other system could also be installed in order to facilitate the maneuvering of these tie rods 13 by the operator. Their maneuvering could also be automated if required.

FIG. 3 represents the detail of the bolts or stops 17 represented in FIG. 1. It is seen that they may pass through the wall 2 of the tank (with a sealing system) and slide in an external guiding base 18, it being possible for this sliding to be controlled automatically for example by a small jack 19 or the like. These stops 17, of which a number may be provided right around the tank 1, will, once actuated, support the perforated platform 11 by its edge, when the latter has reached its top position, will relieve the tie rods 13 and the raking system, and will constitute a safety device for the cleaning worker when this lifting of the platform has allowed him to enter the tank 1, in the space with volume thus augmented which is made between the bottom 3 and the platform 11, in order to clean the lower part of the tank.

It thus clearly follows from the preceding description that when it is desired to carry out the operations of cleaning the tank 1, the latter being emptied of grains, the following procedure will be employed:

with the motor 9 stopped, the motor 10 will be actuated in order to allow the raking system with arms 6 to be lowered to the desired level. An operator, having descended onto the platform 11 (then resting on the bottom 3 via its props 12), will disengage the tie rods 13 from the arms 6 and will attach them to the platform. The motor 10 will then be actuated in its reverse direction in order to lift the platform 11 to the desired level, after which the jacks or the like 19 will be actuated in order to bring out the stops 17 and bring them just beneath the peripheral part of the platform 11. It will then be possible to clean the tank, the platform and all other parts of the installation. When this is finished, the reverse operations will be performed in order to return the platform 11 to its initial position, that is to say with the props 12 again resting on the bottom 3.

In the variant embodiment in FIGS. 4 and 5, the tie rods 13 are dispensed with.

Since what is involved here again is an installation of the type in which the system with raking arms 6 and blades is solidly attached to a hub 7 capable of sliding on an axial column 8 of the tank, it may be characterised in that the hub 7 is associated with means 20 for locking onto a central part 21 of the perforated platform 11, also mounted so as to slide on the axial column 8 of the tank 1, beneath the hub 7. The form of these members is clearly shown in FIG. 4. Here too, the locking means 20 can be actuated by jacks.

The cleaning of the tank 1 and in particular of the lower face of the platform 11, of the walls 2 of the tank in their lower part, and of the bottom 3, may be ensured by a pivoting cleaning boom 22 opened out when the platform 11 is in the top position. This has been represented in FIG. 4, in which it is assumed that the props 12—in contrast to the embodiment in FIG. 1—stay fixed to the bottom 3, which frees above them a space for the rotation of the cleaning boom 22.

In another variant, provision could also be made for the perforated platform 11 to be allowed to pivot when it is mechanically connected to the system with raking arms 6 and blades, and for it to be brought thereby into the lifted position, by virtue of which the lower surface of this platform 11 could be cleaned by a stationary boom situated beneath, and the platform 11 could itself carry another boom suspended from it and capable of cleaning the bottom 3 of the tank 1 and its lateral wall 2 during its rotation.

We claim:

1. An installation for performing an operation on grain comprising:
   a tank having a cylindrical lateral wall and a bottom;
   a perforated platform located in said tank above said bottom and movable vertically in said tank to a desired height whereby the grain which is to be subjected to the operation rests on said platform in a layer with an upper surface;
   a rotary system located in said tank above said platform for leveling the upper surface of the grain, said rotary system including raking arms, blades carried by said raking arms, and a first motor means for rotating said arms and blades;
   a second motor means for vertically moving said rotary system relative to said bottom; and
   a removable connection means for removably connecting said perforated platform to said second motor means such that said perforated platform is movable vertically by said second motor means.

2. An installation as claimed in claim 1 wherein said connection means includes respective tie rods which detachably connect respective said raking arms with said platform.

3. An installation as claimed in claim 2 wherein said connection means further includes respective locking means for holding a respective said tie rod to a respective said raking arm when said tie rod is detached from said platform.

4. An installation as claimed in claim 3 wherein said connection means further includes (a) respective hinge means for hingedly attaching a first end of respective said tie rods to respective said arms and (b) respective removable means for detachably attaching an opposite end of respective said tie rods to said platform with said removable means being retractable into said platform when respective said opposite ends are not attached thereto.

5. An installation as claimed in claim 2 wherein said cylindrical wall of said tank defines a central axis and a radius from the axis to said cylindrical wall, and wherein said connection means connects said tie rods to said platform at a position of about ⅔ of the radius from the central axis.

6. An installation as claimed in claim 2 wherein said tank includes an axial column disposed centrally inside said cylindrical wall; and wherein said rotary system includes a hub which is slidably mounted on said axial column, to which said raking arms are solidly attached, and to which respective ends of said tie rods are hingedly attached.

7. An installation as claimed in claim 1 wherein said tank includes an axial column disposed centrally inside said cylindrical wall; wherein said rotary system includes a hub which is slidably mounted on said axial column; wherein said platform includes a central part which is slidably mounted on said axial column beneath said hub; and wherein said connection means includes a locking means for locking said central part to said hub.

8. An installation as claimed in claim 1 and further including stops movably mounted to said cylindrical wall for movement between a holding position where said platform is engaged vertically and held in place by said stops to a free position where said platform is free to move vertically past said stops, and a moving means for moving said stops between the free and holding positions.

9. An installation as claimed in claim 1 and further including a mounting means for mounting said platform for rotation in said tank about a vertical axis; and wherein said connection means connects said platform to said rotary system such that when said platform is connected to said rotary system said first motor means rotates said platform together with said arms and blades.

10. An installation as claimed in claim 9 and further including a cleaning boom means mounted below said platform for cleaning an underside of said platform, said bottom and a portion of said cylindrical wall below said platform.

* * * * *